April 30, 1946.    A. C. DE BEAUREGARD    2,399,329
ELECTRICAL FOLLOW UP SYSTEM
Filed Dec. 8, 1944    2 Sheets-Sheet 1

INVENTOR.
AMEDEECOSTA de BEAUREGARD
BY Maurice Landus
ATTORNEY

April 30, 1946.  A. C. DE BEAUREGARD  2,399,329
ELECTRICAL FOLLOW UP SYSTEM
Filed Dec. 8, 1944  2 Sheets-Sheet 2
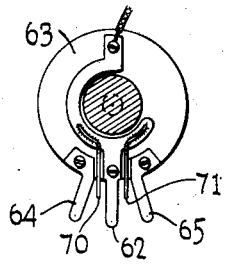
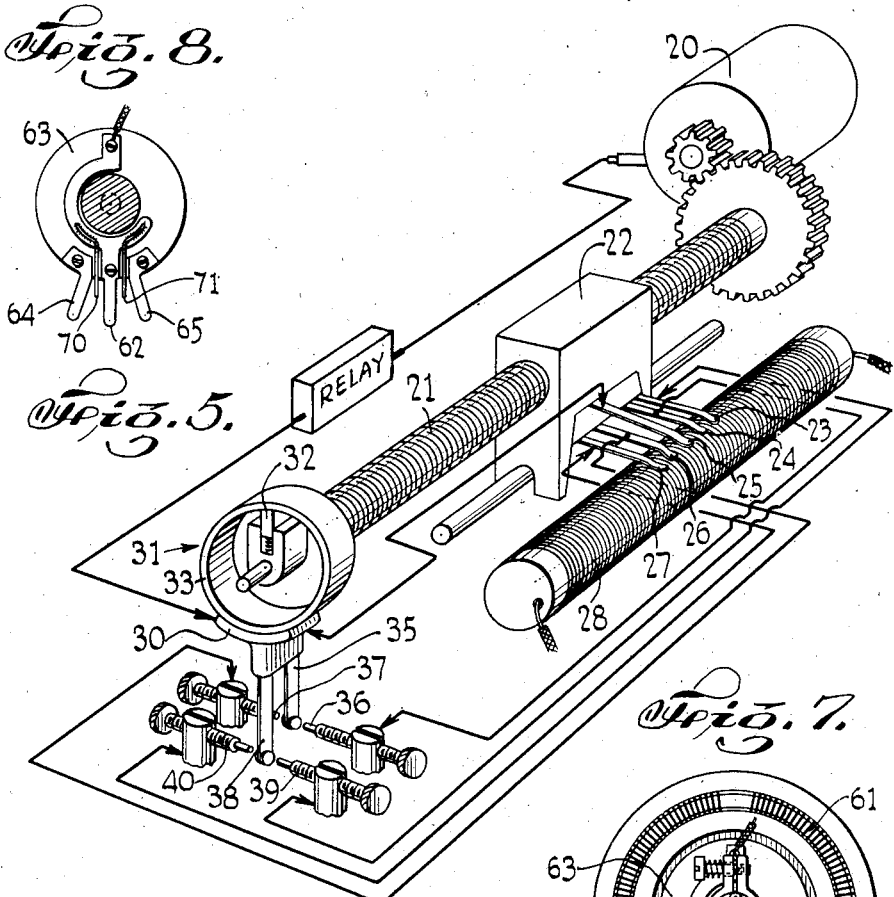
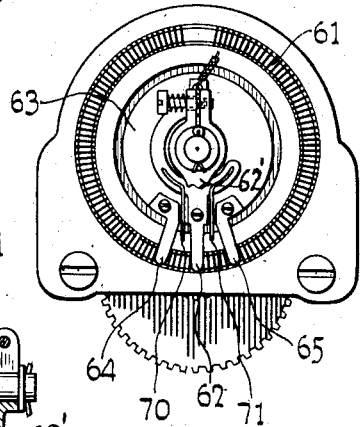
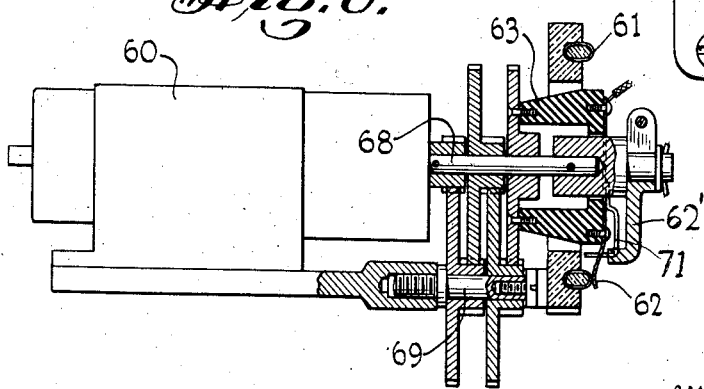
INVENTOR.
AMEDEE COSTA de BEAUREGARD
BY
*Maurice Landeve*
ATTORNEY Patented Apr. 30, 1946

2,399,329

UNITED STATES PATENT OFFICE 2,399,329

ELECTRICAL FOLLOW-UP SYSTEM

Amedee Costa de Beauregard, Locust Valley, N. Y., assignor to Specialties, Inc.

Application December 8, 1944, Serial No. 567,165

10 Claims. (Cl. 172—239)

The present invention relates to an electrical follow-up mechanism and has for an object to provide a follow-up system which will operate accurately and with a minimum of overrun and hunting.

The invention has been developed in connection with the production of a follow-up unit using a Wheatstone bridge circuit in which a remote control contact element moves along a variable resistance constituting one side of the Wheatstone bridge and the follow-up contact moves along a resistance constituting the other side and controls a reversible motor which actuates the driven element of the unit. For convenience of disclosure this embodiment will be described to illustrate the principles of the invention. It will be understood however, that the description of the particular arrangement is illustrative merely and is not intended as defining the limits of the invention.

For purposes of consideration of the embodiment of the invention selected for particular description reference should be had to the accompanying drawings forming a part hereof and in which Figure 1 is an electrical diagram of the Wheatstone bridge circuit, Figure 2 is a perspective view of the principal features of the mechanical and electrical devices, Figure 3 is a sectional detail view taken on the line 3—3 of Figure 2.

Figure 5 is a perspective view of another embodiment.

Figs. 6, 7 and 8 show still another embodiment.

Figure 1:
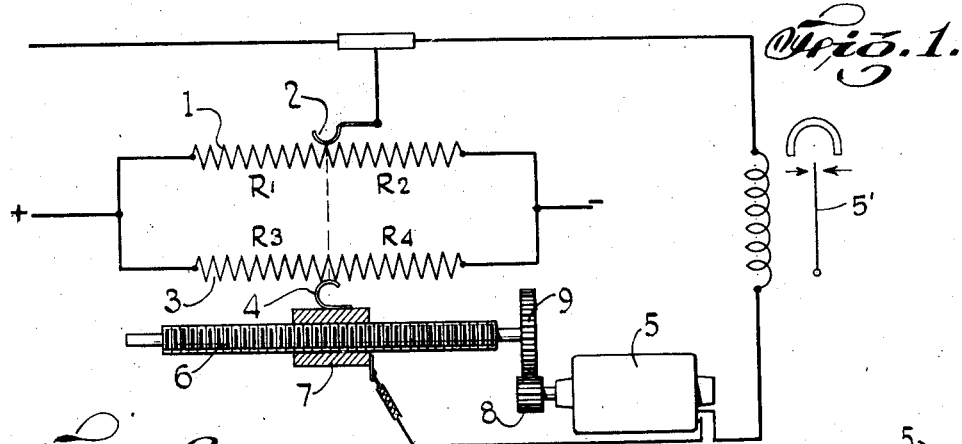

The electrical diagram shows a Wheatstone bridge circuit comprising a resistance 1 which may be suitably arranged at a control station, divided by an adjustable control contact 2 into two resistances R1 and R2 and a second resistance 3 at the follow-up station similarly divided by contact 4 of the follow-up element into resistances R3 and R4.

The cross circuit between the contacts controls through polarized 5' a reversible motor 5 which drives the screw shaft 6 carrying the nut 7, to move the follow-up contact 4 along the resistance 3. The current in the cross circuit will reverse as the follow-up contact moves to right or left of the position of equilibrium. The reversible motor drives the screw shaft 6, through reduction gearing 8, 9 to move the nut 7 back and forth along the screw shaft and therefore the contact 4 back and forth along the variable resistance 3.

If the nut carried a single conventional contact engaging the resistance 3 the motor would overrun at each reversal and hunting would result. In order to avoid overrunning in normal operation and to minimize hunting the contact 4 comprises three contact elements 10, 11 and 12. The contact element 11 preferably, but not necessarily, is always in contact. The other two are spaced in opposite directions along the resistance from the central contact element 11 and engage alternatively. These contact elements will be referred to as lead contacts, because in one direction of movement of the nut one element leads and engages with the resistance and in movement in the opposite direction the other element leads and engages with the resistance. In each case it is the leading contact which is in engagement and functioning together with the central contact element.

Figures 2, 3:
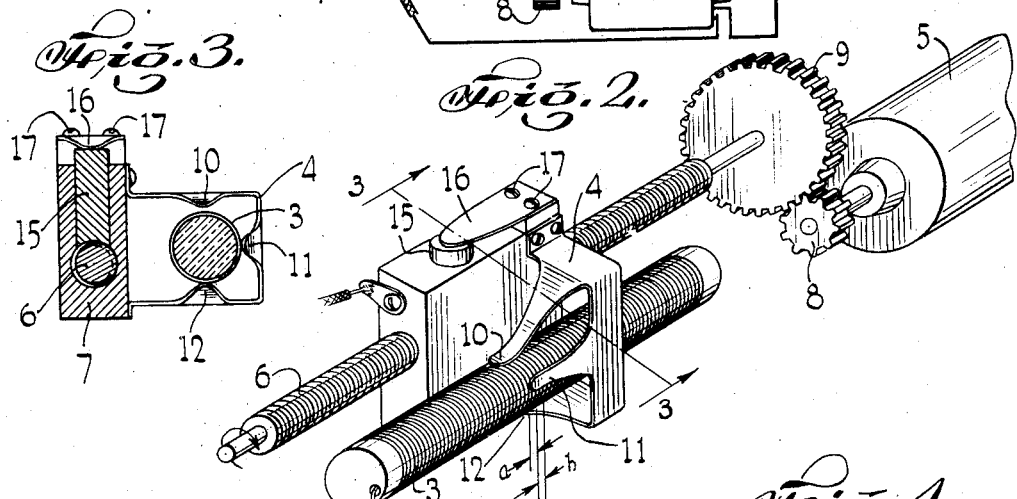

In the embodiment of the invention shown for the purposes of illustration the nut is substantially balanced on the screw shaft so that when the screw shaft turns in one direction or the other the nut will rotate in the direction of turning and thereby bring the leading contact element into engagement with the resistance. In Fig. 3 the nut and the contact carried thereby are shown in the position in which the screw shaft is rotating counter clockwise. This brings the lower contact element 12 into engagement with the resistance and the upper contact element 10 out of engagement. As shown the middle contact element 11 is always in engagement with the resistance in either direction of movement of the screw shaft. When the screw shaft reverses its direction of rotation the contact element 12 will move down and out of engagement with the resistance while at the same time the contact 10 will move down into engagement.

In order that sufficient frictional resistance between the nut and the screw shaft may be maintained a friction plug 15 is provided in the nut and arranged to bear down against the screw shaft. The friction plug is urged downwardly by a spring 16 held in place on the nut by two screws 17. By proper adjustment of the spring effective frictional resistance can be insured. In Fig. 2 the effective lead of the lead contacts over the contact element 11 is indicated as a and b. Both leads are the same. If the extent of lead is correctly chosen the overrunning of the nut will be reduced to a minimum. In fact it has been found in practice possible to make this lead such that there will be no noticeable overrunning of the nut in normal operation.

In order to ascertain the most effective lead for a particular instrument the central contact may be engaged and the two leads contacts omitted for the time being, the apparatus is then operated and the extent of overrun carefully measured under varying conditions of operation. This extent of overrun is a reasonably accurate measure for the lead. Preferably the lead is slightly more rather than slightly less than this measurement indicates.

Theory of operation

Figure 4:
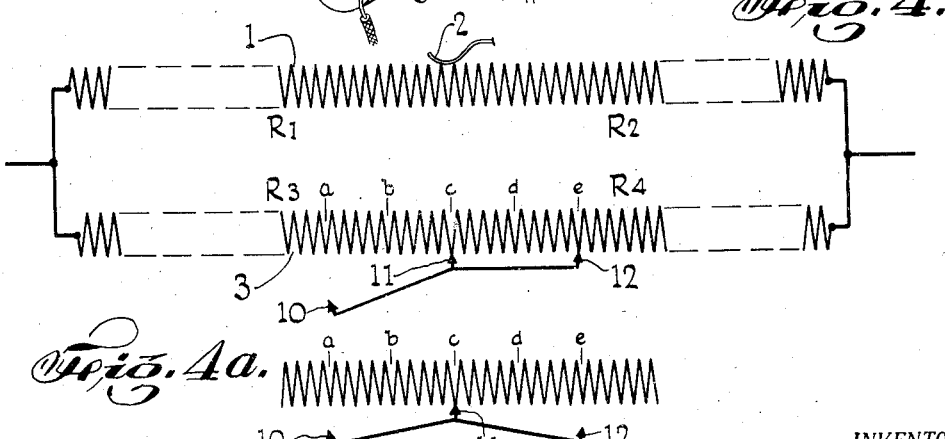
Figure 4, 4a and 4b, are diagrammatic views illustrating the operation of the contacts.
Figure 4A:
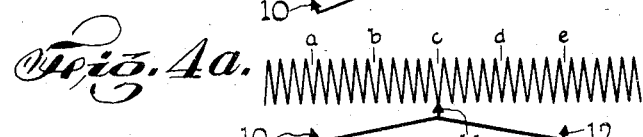
Figure 4B:
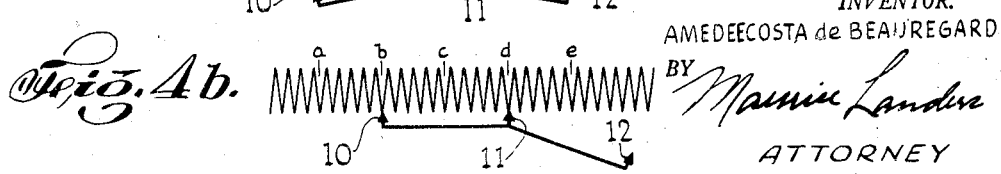

The operation of the electrical circuit will be better understood by reference to Figs. 4, 4a and 4b wherein is shown diagrammatically the three-element contact in different operating positions.

For the purposes of analysis of the operation let us assume that the resistance 3 is a wire coil resistance, each turn of which represents a resistance of 1 milliohm and the lead distance of each lead contact 10, 12 is equal to the spacing of ten coils. In the diagram the rocking contact member pivoted at its center and carrying contact elements 10, 11, 12 represents the traveling follow-up contact 4 of Fig. 4.

In Fig. 4 the reference letters, a, b, c, d, e, represent points on the resistance at intervals of five turns, c representing the center of the coil.

If, we assume that the control contact 2 engages resistance 1 at the center then the ratios of the effective resistances will be R1/R2 equals R3/R4 if the rocking contact is in the position in which the main contact 11 engages its resistance at the point c and both lead contacts are out of engagement as indicated at Fig. 4a, or if the main contact 11 and the lead contact 12 engage the resistance at the points b and d, see Fig. 4, or if the main contact 11 and the lead contact 10 engage the resistance at the points d and b, respectively, see Fig. 4b.

Now it might be assumed from this that in the operation of the circuit the position of the nut would be indeterminate within a distance corresponding to the lead distance of each lead contact. This, however, is not the case, as will be clear from the following analysis.

Assume that the control contact 2 is moved from left to right to the center of resistance 1. The nut and the follower contact 4 will then in the operation of the device be moved by actuation of the motor 5 to move the follower contact to the center of the resistance 3. Let us assume that the motor 5 overruns to the maximum extent, that is to say carrying the contact 11 to engage at the point c on the resistance with the lead contact 12 engaging at the point e.

As the nut moves to the right in Fig. 4, when the main and lead contacts 11 and 12 reach the points b and d, respectively, the respective resistances R3 and R4 will be equal but each will be 5 milliohms less than half of the resistance. Current in the cross circuit will therefore reverse as this position is passed and, as the lead contact 12 reaches the position e, according to our assumption, the motor will stop and reverse. Note, at this instant the resistance R3 is 10 milliohms greater than resistance R4. The reversed rotation of the screw shaft even before any longitudinal movement of the nut will swing the contact unit causing lead contact 12 to disengage and the opposite lead contact 10 to engage the resistance. At this instant the resistance R3 will be 10 milliohms less than resistance R4 and the current in the cross circuit will again be positive to again reverse the motor 5.

In this condition of the circuit the motor will be reversed repeatedly with a frequency depending upon the characteristics of the motor and the circuit. In apparatus constructed substantially as indicated in Fig. 2, and operated with complete success, the motor shaft rotates less than one-half turn at each reversal. With the reduction gearing shown the hunting movement is negligible.

Now let us assume that because of particular conditions of operation, such for example as a very slow movement of the control contact along the resistance 1, the contacts 11 and 12 move only one turn of the resistance coil beyond the positions and when the control contact is brought to the central position. In this case, during the movement of the control contact and the follower towards the right, in Fig. 4, the resistance R3 will be less than the resistance R4 until the least contact 12 passes the point d, but when it stops at the position one turn of the coil further the resistance R3 will be 2 milliohms greater than the resistance R4. This will be sufficient to reverse the motor 5 lifting contact 12 and engaging contact 10. After this reversal the resistance R3 will immediately be 18 milliohms less than resistance R4 causing another reversal of motor 5. Now if the two series of reversals were caused by currents of the same voltage the contacts might oscillate in the assumed position with the contact 11 one turn to the right of the position b but because in the condition of operation now under consideration the impulse of the motor in one direction is due to a relatively large difference, 18 milliohms, in the effective resistances R3 and R4 while the impulses in the opposite direction are caused by a relatively small difference, 2 milliohms, this condition of operation quickly causes the follower nut and the follower contacts carried thereby to find their true position.

Fig. 5 shows another embodiment of the invention. The motor 20 drives the screw shaft 21 through reduction gearing. A nut 22 on the screw carries contacts 23, 24, 25, 26, 27 in constant engagement with the resistance 28 of a Wheatstone bridge or similar circuit. The principle of operation and the circuits for reversing the motor 20 are similar to those of the embodiment previously described except that instead of alternatively lifting contacts from engagement with the resistance the respective circuits are opened at another position. The cross circuit of the Wheatstone bridge is connected always to the center contact 25 and, alternatively, depending upon the direction of rotation of the reversible motor 20, to one or other of the contacts 24 and 26.

In this arrangement there is an additional feature whereby if the motor is running at high speed then one or the other of the contacts 23 and 27 is connected in the circuit to provide a greater lead in order that the more rapidly moving nut may still not overrun in spite of its higher speed.

Any suitable arrangements may be provided for operatively connecting a lead contact in the circuit and disconnecting the contact which upon reversal, has ceased to be the lead contact. Also any suitable arrangement may be provided for rendering effective the circuits to one or other of the contacts 23 and 27 to provide in effect a greater lead. The arrangement shown in Fig. 5 is sufficiently illustrative for the purpose of disclosing the principles involved. As shown, a contact carrier 30 is mounted on the shaft 21 to be moved through a limited angle in the direction of rotation of the shaft through a centrifugal friction clutch 31. A spring pressed clutch shoe 32 of substantial weight presses against the drum 33 of the member 30. The friction of the shoe 32 as urged outwardly by its spring against the drum is sufficient in any event, to move the contact 35 of the member 30 in the direction of rotation into engagement with either contact 36 or 37. The contact 35 is a spring of predetermined flexibility such as to substantially resist rotation of the member 30. If, however, the screw shaft is rotating at high speed then the shoe 32 pressing with considerable force will apply sufficient torque to the member 30 to overcome the resistance of the spring 35 and a second contact member 38 carried by the member 30 will be pressed into engagement with one or the other of the contacts 39 and 40. Now the contacts 36 and 37 are connected respectively to the lesser lead contacts 24 and 26 while the contacts 39 and 40 are connected respectively to the greater lead contacts 23 and 27.

In operation of this embodiment of the invention, if the motor is running at relatively low speed then only the contacts providing lesser lead will function in the reversing circuit of the motor and the operation will be substantially the equivalent of that of the embodiment first described. If, however, the control is so operated that the motor runs at unusually high speed then the auxiliary contacts 23 and 27 function to provide the maximum lead and thereby prevent overrunning due to the greater speed.

Obviously, the principle of the arrangement shown in Fig. 5 whereby auxiliary contacts are provided to afford greater lead for high speed operation could be applied to the arrangement shown in Fig. 2 if desired. In order to accomplish this the centrifugal clutch and contact devices shown in Fig. 5 could be applied on the motor shaft or on the screw shaft of that embodiment and auxiliary contacts could be applied to but insulated from the contact member 4 and engaging the resistance 3 at points beyond the contact elements 10 and 12.

In this case the spring contact 35 could serve merely as a spring to control movement of the member 30, the contacts 36 and 37 serving merely as stops. The contacts 39 and 40 would be connected to the auxiliary contacts carried by the member 4. Such a combination would provide all of the advantages of the embodiment shown in Fig. 2, together with the advantages of the auxiliary contact arrangements.

In Fig. 6 another embodiment of the invention is shown in which the shaft of the reversible motor 60 extends through the center of the variable resistance 61 of a Wheatstone bridge circuit and carries at its free end a frictionally connected contact 62 in constant engagement with the resistance. A collar 63 carries two contacts 64 and 65 engaging the resistance on either side of the contact 62 and spaced therefrom to provide the desired lead.

The collar 63 is driven from the motor shaft by means of a suitable reduction gearing mounted on the motor shaft 68 and on a suitable countershaft 69. As shown in the drawing the reduction gearing comprises several pinions each of which meshes with and drives a gear of substantially larger diameter. A pinion secured to the motor shaft drives the first gear of the series and each of the other pinions forms one member of a gear pinion combination loosely mounted on the motor shaft or on the counter shaft. The last gear of the series is secured to the hub on which the collar 63 is mounted.

Contacts 64 and 65 are insulated from each other. The collar 63 carries also two flexible contacts 70 and 71 movable into engagement respectively with the contacts 64 and 65. These contacts are normally out of engagement with contacts 64 and 65 but may be pressed into engagement with one or the other when the central arm 62' is driven in one direction or the other by the motor shaft. The friction between the hub of arm 62' and the motor shaft is just sufficient to cause it to press one of the contacts 70 and 71 into engagement with one of the corresponding contacts 64 and 65. In this position of parts the central contact 62 and one lead contact are connected to function in the circuit.

The foregoing particular description of selected embodiments is illustrative merely and is not intended as defining the limits of the invention.

I claim:

1. In a follow-up mechanism, in combination, a reversible motor, a control element, an electrical circuit for controlling said motor, the circuit being reversible in response to movements of the control element and including a variable resistance and a variable contact engageable with said resistance, a follower, and means actuated by the reversible motor to move the follower, said variable contact having two lead contact elements one leading and engaging the resistance during movement of the follower in one direction and the other leading and engaging the resistance during movement of the follower in the opposite direction.

2. In an electrical follow-up system a Wheatstone bridge circuit, a control contact engageable with intermediate points of one resistance, a follower contact engageable with intermediate points of and movable along another resistance, a reversible motor and means actuated thereby for moving the follower contact along the resistance, the follower contact having lead contact elements and means for causing one lead contact element to engage the resistance during movement in each direction.

3. An electrical follow-up system comprising in combination, a variable resistance, a contact unit moveable along said resistance, and a reversible motor and gearing for moving said contact unit, said contact unit comprising a central contact constantly engaged with the resistance and two lead contacts spaced from the central contact and engageable with the resistance alternatively in advance of the point of engagement of the central contact as the contact unit moves in one direction or the other along the resistance.

4. An electrical follow-up system comprising in combination a Wheatstone bridge circuit including a variable resistance and a cross circuit, a reversible motor controlled by the cross circuit, a screw shaft driven by the motor, a nut on the screw shaft, a contact in constant engagement with the resistance and a pair of lead contacts connected to the cross circuit and engageable with the resistance at spaced points and means for causing one lead contact to engage the resistance when the motor is running in one direction and the other lead contact to engage when the motor is running in the opposite direction.

5. In an electrical follow-up system, in combination, a reversible motor, a follower driven in opposite directions by the reversible motor, a variable resistance, a plurality of contacts engaging said variable resistance and moved by said follower along said resistance including one contact in constant engagement with the resistance, a second contact serving as a lead contact extending forwardly in the direction of movement along said resistance while the follower is being driven in one direction by the reversible motor, and a third contact serving as a lead contact extending forwardly in the direction of movement along said resistance in the opposite direction when said follower is driven in the opposite direction by the reversible motor, and means actuated by the reversible motor to open the circuit through the then leading contact and to close the circuit through the other lead contact upon each reversal of the motor.

6. In an electrical follow-up system, a reversible motor, a screw shaft driven by the motor, a follower nut on said shaft, a variable resistance, contacts spaced along said resistance and driven by the follower nut, one of said contacts serving as a lead contact during movement in one direction, another contact serving as lead contact during movement in the opposite direction, and means whereby one lead contact is disengaged and the other engaged with the resistance when the motor reverses and before longitudinal movement of the nut occurs.

7. In a follow-up system, in combination, a reversible motor, an electrical circuit for controlling said motor comprising a variable resistance, a follower driven by the reversible motor, a contact carried by the follower engaging said resistance, a pair of lead contact elements, one leading and engaging the resistance during movement of the follower in one direction, the other leading and engaging the resistance during movement of the follower in the opposite direction, and at least one auxiliary contact element of greater lead engageable with the resistance during movement in one direction together with means to render the auxiliary contact element effective when the motor runs at exceptionally high speed only, substantially as and for the purpose described.

8. In an electrical follow-up system, in combination, a reversible motor, a follower driven in opposite directions by the reversible motor, a variable resistance, a plurality of contacts engageable with said resistance and moved by said follower along said resistance, one contact serving as a lead contact extending forwardly in the direction of movement along said resistance only while the follower is being driven in one direction, another contact serving as an auxiliary lead contact of greater lead in the same direction and means for rendering the auxiliary lead contact effective only when the motor is operating at a predetermined high speed.

9. In an electrical follow-up system, in combination, an arcuate resistance, a contact set movable along said arcuate resistance, comprising a central contact constantly engaging the resistance and lead contacts on either side thereof, a reversible motor connected to move said contact set in opposite directions along said resistance, and means for the forward one of the lead contacts to be connected electrically to the central contact during movement in either direction.

10. An electrical follow-up system comprising in combination a Wheatstone bridge circuit including a variable resistance and a cross circuit, a reversible motor controlled by the cross circuit, a screw shaft driven by the motor, a nut on the screw shaft, a pair of lead contacts connected to the cross circuit carried by said nut and engageable at points spaced along the resistance, said nut having limited rotative movement with the screw shaft to cause engagement of the lead contacts with the resistance alternatively as the shaft rotates in one direction or the other.

A. COSTA DE BEAUREGARD.